United States Patent Office 3,410,860
Patented Nov. 12, 1968

3,410,860
ISOXAZOLES
Raphael Ralph G. Haber, Givatayim, and Eva Schoenberger, Bat Yam, Ramat Yosef, Israel, assignors to Abic Limited, a corporation of Israel
No Drawing. Filed Mar. 26, 1965, Ser. No. 443,172
Claims priority, application Israel, Apr. 5, 1964, 21,104
13 Claims. (Cl. 260—296)

ABSTRACT OF THE DISCLOSURE

New isoxazoles of the formula

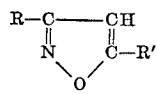

wherein R and R' are each a member selected from the group consisting of lower alkyl, lower haloalkyl, phenyl, halophenyl, lower alkyl-substituted phenyl, nitrophenyl, lower alkoxyphenyl, thienyl, pyridyl, furyl, and 5'-nitrofuryl, at least one of these substituents R and R' being a 5'-nitrofuryl radical, are prepared:

(1) by nitrating a compound of the formula

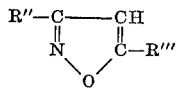

wherein R" and R''' are each a member selected from the group consisting of lower alkyl, lower haloalkyl, phenyl, halophenyl, lower alkyl-substituted phenyl, nitrophenyl, lower alkoxyphenyl, thienyl, pyridyl, furyl and 5'-nitrofuryl, at least one of these substituents R" and R''' being a furyl radical; or (2) by reacting a 1-(5'-nitrofuryl)-1,3-diketopropane derivative of the formula

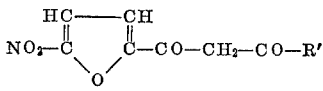

in which R' is a member selected from the group consisting of lower alkyl, lower haloalkyl, phenyl, halophenyl, lower alkyl-substituted phenyl, nitrophenyl, lower alkoxyphenyl, thienyl, pyridyl, furyl and 5'-nitrofuryl, with hydroxylamine or one of its salts.

The compounds show excellent antibacterial and antifungal activity, particularly against *Staph. aureus*.

The present invention relates to new isoxazoles, to processes for their production and to compositions containing said isoxazoles.

The present invention consists in isoxazoles of general Formula I

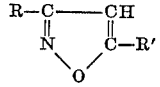

wherein R and R' are each a member selected among the group consisting of a substituted- and an unsubstituted lower alkyl-, aryl- and heteroaryl radical, at least one of the substituents R and R' being a 5'-nitrofuryl radical.

Preferred aryl and heteroaryl radicals are the phenyl, furyl, thienyl and pyridyl radicals. The substituents with which these radicals, as well as the lower alkyl radicals, are preferably substituted are selected among the group consisting of halogen, nitro, lower alkyl and lower alkoxy radicals.

In connection with the present specification the terms "lower alkyl" and "lower alkoxy" embrace those alkyl and alkoxy radicals which contain 1–4 carbon atoms.

The present invention consists also in processes for the preparation of isoxazoles of general Formula I.

One process for the preparation of isoxazoles of general Formula I consists in the nitration of isoxazoles of general Formula II

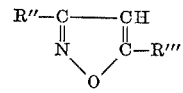

wherein R" and R''' are each a member selected among the group consisting of a substituted- and an unsubstituted lower alkyl-, aryl- and heteroaryl radical, at least one of the substituents R" and R''' being a furyl radical.

It has been found that the best manner to carry out said nitration is by reacting the isoxazole of general Formula II with a mixture of concentrated sulfuric acid and concentrated nitric acid, preferably in a ratio of 5–8 mols sulfuric acid and 1.2–1.8 mols of nitric acid to 1 mole of isoxazole of general Formula II, at a low temperature, preferably at —25 to —18° C., in an inert solvent, preferably chloroform. The reaction mixture is then worked up in a conventional manner.

Another process for the preparation of isoxazoles of general Formula I, consists in the reaction of a 1-(5'-nitrofuryl)-1,3-diketopropane derivative of general Formula III

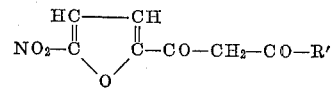

in which R' has the same meaning as above, with hydroxylamine or one of its salts in an inert solvent. The process is preferably carried out at the boiling temperature of the solvent and the preferred inert solvent is a lower alcohol, e.g. methanol, isopropanol, etc. The hydroxyl amine or one of its salts is preferably added as an aqueous solution.

The 1-(5'-nitrofuryl)-1,3-diketopropane derivatives of general Formula III may be prepared by nitrating the corresponding 1-furyl-1,3-diketopropane derivatives. This nitration is preferably carried out in the same manner as the nitration of isoxazoles of general Formula II described above.

Applicants assume that generally the reaction of the diketone of general Formula III with the hydroxylamine proceeds in such a manner that the NH₂ and OH groups of the hydroxylamine react with the C₁ and C₃ atoms, respectively, of the diketone and therefore yields isoxazoles of general Formula IV

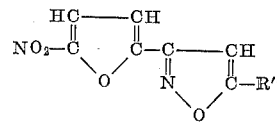

in which R' has the same meaning as above.

However, there exists the possibility that the NH₂ and OH groups of the hydroxylamine react with the C₃ and C₁ atoms, respectively, of the diketone and that the reaction yields a mixture of isomers or isoxazoles of general Formula V

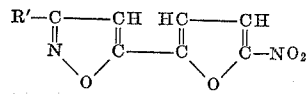

in which R' has the same meaning as above.

Applicants have named the isoxazoles obtained according to their assumption. However, the present invention is not limited by this assumption.

In connection with the present invention an inert solvent means an organic solvent which is inert towards the reactants and the end products obtained, respectively, in the respective process.

The new isoxazoles according to the present invention are relatively non-toxic and show excellent antibacterial and antifungal activity, in particular against *Staph. aureus*, the dreaded cause of hospital infection. The antibacterial activity of the new compounds encompasses activity against gram-positive and negative bacteria as well as against fungi.

The antibacterial activity of some of the new isoxazoles according to the present invention is shown in Table I. Table I indicates the minimum inhibitory concentration of the compound under reference in mg./100 cc. required in order to inhibit the growth of between 1 and 6 strains of each type. The measurements have been carried out by the conventional tube dilution method at 37° C. after 24 hours.

form, the temperature being kept all the time at −20°. A clear greenish solution was obtained which was kept for further two hours at −20°, 40 g. of crushed ice were then added to the solution and the mixture was stirred for 2–3 hours at room temperature. The solid yellow compound which precipitated was filtered off, washed with water, dissolved in acetone, the acetonic solution was admixed with charcoal, filtered and the compound was reprecipitated from the solution to yield 3 g. of bright yellow crystals, being 3,5-di-(5′-nitrofuryl)-isoxazole, M.P. 220° (decompn.). After further recrystallisation from acetone the compound became white and the M.P. rose to 224°. An analytical sample having a M.P. of 224.5° was prepared. The analysis was calculated for $C_{11}H_5N_3O_7$.

Calculated, percent: C, 45.38; H, 1.73; N, 14.43; O, 38.47.

Found, percent: C, 45.87; H, 1.98; N, 14.35; O, 38.61.

TABLE I

| Compound | Staph. aureus | Shig. sonnei | Shig. flex | E. coli | Salmonella | Cand. albicans | Ps. pyocyanea |
|---|---|---|---|---|---|---|---|
| 3-(5′-nitrofuryl)-5-methyl-isoxazole | 0.1–1 | 0.25–0.5 | 0.1–0.5 | 0.5 | 1 | 2.5 | 10 |
| 3,5-di-(5′-nitrofuryl)-isoxazole | 0.025–0.1 | 0.05–0.1 | 0.05–0.1 | 0.1–0.5 | 0.1–0.5 | 10 | 10 |
| 3-(5′-nitrofuryl)-5-furyl-isoxazole | 0.5 | 0.05–0.1 | 0.05 | 0.5 | 1–2.5 | 2.5 | 10 |
| 3-(5′-nitrofuryl)-5-(3″-pyridyl)-isoxazole | 0.1–0.5 | 0.1–0.5 | 0.1–0.5 | 0.1–0.5 | 0.1 | 2.5 | >5 |
| 3-(5′-nitrofuryl)-5-thienyl-isoxazole | 0.05–0.5 | 0.05–0.1 | 0.1–0.5 | 0.1 | 0.5–1 | >5 | >5 |

The new isoxazoles according to the present invention may be used in veterinary as well as in human medicine. The new isoxazoles may be prescribed to be taken per se, but are preferably prescribed in the form of tablets, capsules, ampules, ointments, tinctures or solutions, said preparations being prepared in a conventional manner, i.e. by the addition of suitable binders, extenders, emulsifyers, solvents, other suitable therapeutic compounds and the like.

The new isoxazoles according to the present invention may also be used as feed additives. The new isoxazoles may either be admixed directly with the feed, advantageously in an amount of about 0.001–1% of the total feed, or as a part of a pre-mix. Such pre-mix may contain, besides the new isoxazole, any suitable carrier and/or feed additive, e.g. bentonite, $C_aCO_3$, soyabean meal, corn meal and the like. The pre-mix should contain about 1–95% of the new isoxazole.

The invention will be illustrated by the following examples without being limited by them. All temperatures are indicated herein in degrees centigrade. All melting points are uncorrected.

Example 1

1.8 g. of (5′-nitro-2′-furoyl)-2-furoyl-methane were dissolved in 50 ml. of isopropanol. 2.9 g. of hydroxylamine hydrochloride dissolved in 10 ml. of water were added to the above solution. The resulting mixture was refluxed for 5 hours. After cooling a precipitate was obtained, which was filtered off to yield 1.21 g. of a yellow compound being 3-(5′-nitrofuryl-5-furyl-isoxazole, M.P. 202–202.5°. After recrystallisation from isopropanol the M.P. was 202.5°.

The analysis was calculated for $C_{11}H_6N_2O_5$.

Calculated, percent: C, 53.66; H, 2.45; N, 11.38; O, 32.50.

Found, percent: C, 53.77; H, 2.71; N, 11.29; O, 32.31.

Example 2

3 g. of 3, 5-difuryl-isoxazole were dissolved in 100 ml. of dry chloroform at room temperature, in a flask fitted with a mechanical stirrer, a dropping funnel and a thermometer. The temperature of the solution was lowered to −20°. At this temperature there were added in succession 8.8 ml. of concentrated sulfuric acid and a solution of 1.7 ml. of concentrated nitric acid in 10 ml. of chloro- Example 3

3,5-difuryl-isoxazole dissolved in chloroform was nitrated in the same manner as described in Example 2 but only half the quantity of nitrating agents were used and the nitration time was reduced to half. There was a mixture of isomers obtained being a mixture of 3-(5′-nitrofuryl)-5-furyl-isoxazole and 3-furyl-5-(5′-nitrofuryl)-isoxazole, M.P. 175°. The analysis was calculated for $C_{11}H_6N_2O_5$.

Calculated, percent: C, 53.66; H, 2.45; N, 11.38; O, 32.05.

Found, percent: C, 53.84; H, 2.50; N, 11.54; O, 32.66.

When this mixture was further nitrated 3,5-di-(5-nitrofuryl)-isoxazole was obtained.

Example 4

(a) 1.97 g. of (5′-nitro-2′-furoyl)-acetyl-methane were dissolved in 50 cc. of methanol and to the solution obtained were added 2 g. of hydroxylamine hydrochloride in 10 ml. of water. The resulting mixture was refluxed for 2 hours. After cooling a precipitate was obtained which was filtered off to yield 1.8 g. of a brown compound being 3-(5′-nitrofuryl)-5-methyl-isoxazole, M.P. 130–132°. After recrystallisation from isopropanol the M.P. rose to 132–132.5°. The analysis was calculated for $C_8H_6N_2O_4$.

Calculated, percent: C, 49.49; H, 3.11; N, 14.43; O, 32.97.

Found, percent: C, 49.63; H, 3.17; N, 14.36; O, 33.19.

(b) A solution of 2.83 g. of 3-furyl-5-methyl-isoxazole in 76 ml. of chloroform was cooled to −20°. A mixture of 6 ml. of concentrated sulfuric acid and of 1.25 ml. of concentrated nitric acid was added to the solution so that the temperature remained all the time below −20°. The mixture was stirred for further 2 hours at −20°, then 30 g. of crushed ice were added and the mixture was thereafter stirred for further 1½ hours. The two layers obtained were separated from each other. The organic layer was washed with a potassium bicarbonate solution and the aqueous layer was thrice extracted with chloroform. The organic solutions were combined, dried and the chloroform was distilled off to yield 2.2 g. of 3-(5′-nitrofuryl)-5-methyl-isoxazole, which after recrystallisation from isopropanol had a M.P. of 132–132.5°.

Example 5

In a manner analogous to that described in Example 4b was prepared:

3-(5'-nitrofuryl)-5-ethyl-isoxazole, M.P. 128–129°.

Example 6

(a) 1 g. of (5'-nitro-2'-furoyl)-benzoyl-methane was dissolved in 50 ml. of boiling isopropanol 3 g. of hydroxylamine hydrochloride dissolved in 10 ml. of water were added to the solution obtained and the resulting mixture was refluxed, with stirring, for 6 hours. The mixture was left to stay overnight, concentrated, cooled and the precipitate obtained was filtered off. 1 g. of 3-(5'-nitrofuryl)-5-phenyl-isoxazole was obtained, M.P. 192–194°. After recrystallisation from isopropanol the M.P. was 193–194°. The analysis was calculated for $C_{13}H_8O_4N_2$.

Calculated, percent: C, 60.94; H, 3.14; N, 10.94. Found, percent: C, 60.91; H, 3.30; N, 10.75.

(b) 2.75 g. of 3-furyl-5-phenyl-isoxazole were placed in 48 ml. of chloroform and the solution was placed in a three-necked flask, provided with a low temperature thermometer, a dropping funnel and a mechanical stirrer. The temperature of the solution was lowered to −20° and then were added in succession 3.82 ml. of concentrated sulfuric acid and a solution of 0.73 ml. of nitric acid in 6.5 ml. of chloroform whereby the temperature was all the time kept below −20°. Thereafter the temperature was maintained for another hour at −20°, then 10 g. of crushed ice were added and stirring was continued for another 2 hours. A yellow precipitate was obtained which was filtered off to yield 3-(5'-nitrofuryl)-5-phenyl-isoxazole, M.P. 185–187°.

The mother liquor was separated in a separatory funnel. The organic layer was washed with a potassium bicarbonate solution and the aqueous layer was extracted thrice with chloroform. The organic solutions were combined, dried and the chloroform was distilled off to yield another 1.35 g. of compound. Total yield about 55%. The product obtained by this reaction was identical with the one obtained by method a. This was proved by elementary analysis, by a mixed melting point determination and by identical IR-spectra.

Example 7

In a manner analogous to that described in Example 6b the following compounds were prepared:

(a) 3 - (5'-nitrofuryl) - 5-(p - chlorophenyl)-isoxazole, M.P. 193–195°

The analysis was calculated for $C_{13}H_7N_2O_4Cl$.

Calculated, percent: C, 53.71; H, 2.43; N, 9.37; Cl, 12.12. Found, percent: C, 53.94; H, 2.59; N, 9.52; Cl, 12.04.

(b) 3 - (5' - nitrofuryl) - 5-(p-bromophenyl)-isoxazole, M.P. 209–210°.

The analysis was calculated for $C_{13}H_7N_2O_4Br$.

Calculated, percent: C, 46.59; H, 2.11; N, 8.36; Br, 23.85. Found, percent: C, 46.49; H, 2.24; N, 8.26; Br, 24.01.

(c) 3-(5'-nitrofuryl)-5-(p-tolyl)-isoxazole, M.P. 196–196.5°.

The analysis was calculated for $C_{14}H_{10}N_2O_4$.

Calculated, percent: C, 62.22; H, 3.73; N, 10.37. Found, percent: C, 62.05; H, 3.76; N, 10.52.

(d) 3-(5'-nitrofuryl)-5-thienyl-isoxazole, M.P. 189.5–191°.

The analysis was calculated for $C_{11}H_6O_4N_2S$.

Calculated, percent: C, 50.39; H, 2.31; N, 10.68; S, 12.20. Found, percent: C, 50.22; H, 2.34; N, 10.84; S, 12.28.

(e) 3 - (5' - nitrofuryl) - 5 - (4"-methoxy-3"-nitrophenyl)-isoxazole, M.P. 235–236°.

The analysis was calculated for $C_{14}H_9N_3O_7$.

Calculated, percent: C, 50.76; H, 2.74; N, 12.69; O, 33.81. Found, percent: C, 50.83; H, 3.05; N, 12.57; O, 33.39.

(f) 3 - (5' - nitrofuryl)-5-(2"-pyridyl)-isoxazole, M.P. 234–235°.

The analysis was calculated for $C_{12}H_7N_3O_4$.

Calculated, percent: C, 56.04; H, 2.74; N, 16.34. Found, percent: C, 56.23; H, 2.92; N, 16.41.

(g) 3 - (5' - nitrofuryl) - 5 - (3"-pyridyl)-isoxazole, M.P. 193–194°.

The analysis was calculated for $C_{12}H_7N_3O_4$.

Calculated, percent: C, 56.04; H, 2.74; N, 16.34; O, 24.88. Found, percent: C, 56.15; H, 2.83; N, 16.32; O, 25.03.

Example 8

A mixture consisting of:

| | G. |
|---|---|
| Polyethylene glycol 4000 | 200 |
| Polyethylene glycol 1500 | 200 |
| Polyethylene glycol 300 | 250 |
| Propylene glycol | 125 |
| Cetyl alcohol | 20 | was heated on a steam bath to yield a melt. 2 g. of a finely powdered 3,5-di-(5'-nitrofuryl)-isoxazole, prepared as described in Example 2, were added to the melt with stirring. After cooling the mass obtained was passed through an ointment roller to yield a yellow ointment.

Example 9

A solid mixture was prepared by intimately mixing in a Fisher-Kendall mixer 1 g. of 3-(5'-nitrofuryl)-5-furyl-isoxazole, prepared as described in Example 1, 44 g. of lactose, 5 g. of calcium carbonate and 50 g. of soyabean meal. This mixture was used as a pre-mix to be admixed with an animal feedstuff.

We claim:

1. A compound of the formula $$\begin{array}{c} R-C\text{———}CH \\ \parallel \quad\quad\quad \parallel \\ N \quad\quad C-R' \\ \diagdown\,O\,\diagup \end{array}$$

wherein R and R' are each a member selected from the group consisting of lower alkyl, lower haloalkyl, phenyl, halophenyl, lower alkyl-substituted phenyl, nitrophenyl, lower alkoxyphenyl, thienyl, pyridyl, furyl, and 5'-nitrofuryl, at least one of these substituents R and R' being a 5'-nitrofuryl radical.

2. 3-(5'-nitrofuryl)-5-furyl-isoxazole.
3. 3,5-di-(5'-nitrofuryl)-isoxazole.
4. 3-(5'-nitrofuryl)-5-methyl-isoxazole.
5. 3-(5'-nitrofuryl)-5-phenyl-isoxazole.
6. 3-(5'-nitrofuryl)-5-ethyl-isoxazole.
7. 3-(5'-nitrofuryl)-5-(p-chlorophenyl)-isoxazole.
8. 3-(5'-nitrofuryl)-5-(p-bromophenyl)-isoxazole.
9. 3-(5'nitrofuryl)-5-(p-tolyl)-isoxazole.
10. 3-(5'-nitrofuryl)-5-thienyl-isoxazole.
11. 3 - (5' - nitrofuryl)-5-(4"-methoxy-3"-nitrophenyl)-isoxazole.
12. 3-(5'-nitrofuryl)-5-(2"-pyridyl)-isoxazole.
13. 3-(5'-nitrofuryl)-5-(3"-pyridyl)-isoxazole.

References Cited

Dunlop et al., The Furans (Reinhold Publishing Co., New York, 1953), pp. 142–148.

Hickenbottom, Reactions of Organic Compounds (London, 1948), pp. 54–56.

Wiley, Heterocyclic Compounds (vol. 17), (New York, 1962), pp. 6–8 and 50.

ALTON D. ROLLINS, *Primary Examiner.*